J. P. SMITH.
Corn Sheller.
No. 14,374.
Patented March 4, 1856.
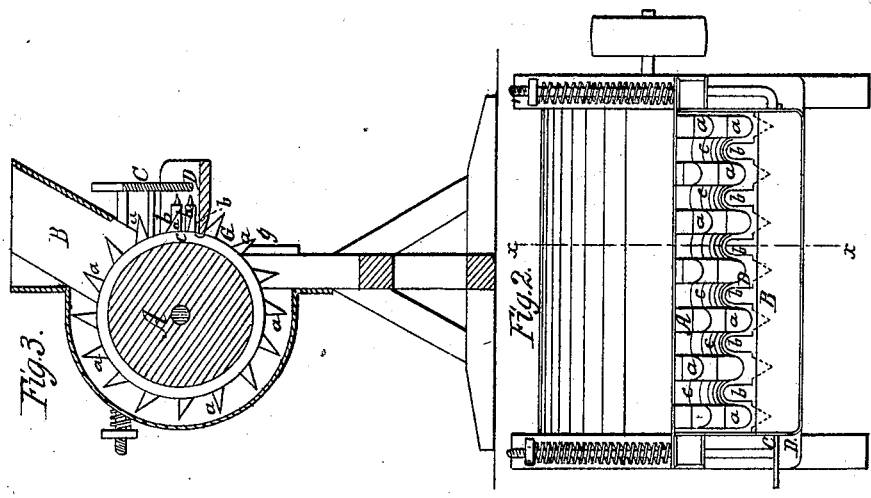
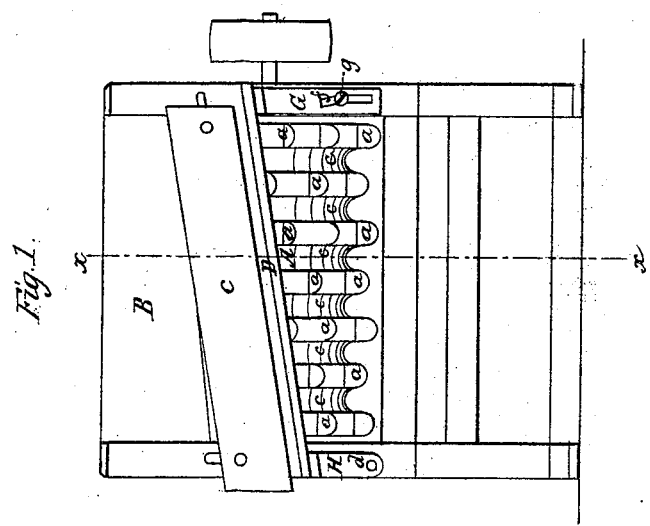

UNITED STATES PATENT OFFICE.

JEREMIAH P. SMITH, OF HUMMELSTOWN, PENNSYLVANIA.

CORN-SHELLER.

Specification of Letters Patent No. 14,374, dated March 4, 1856.

*To all whom it may concern:*

Be it known that I, JEREMIAH P. SMITH, of Hummelstown, in the county of Dauphin and State of Pennsylvania, have invented a new and Improved Corn-Sheller; and I do hereby declare that the following is a full and exact description thereof, reference being had to the accompanying drawings, making part of this specification, Figure 1 being a side elevation of the corn-sheller; Fig. 2, a plan of the same; Fig. 3, a vertical section in the plane $x$, $x$, Figs. 1 and 2.

Like letters designate corresponding parts in all the figures.

My improvements consists, first, in forming grooves, or channels, in the periphery of the shelling cylinder, between the rows of teeth therein, into which the teeth of the breast-beam are made to project, so that the cobs may not get around the ends of said teeth, and thereby be broken, or clog the machine; secondly in adjusting the breast-beam to different degrees of inclination, to suit the different conditions of the corn to be shelled.

Between the rows of teeth $a$, $a$, around the periphery of the cylinder A, I form grooves $c$, $c$, of any suitable depth to accomplish the desired purpose. Into these grooves, the teeth $b$, $b$, of the breast beam D, project sufficiently to reach beyond the general periphery of the cylinder, as indicated by the dotted line in Fig. 2, and shown in Fig. 3; but not to come in contact with the cylinder. The object of this arrangement is to prevent the cobs getting between the ends of the teeth $b$, $b$, and the cylinder A, and so be crushed, and clog the machine. Another advantage is that I am thus enabled to make the breast-beam D, adjustable to any desired inclination, without disturbing the action of the cylinder against it. This adjustment is accomplished by having one of the supporting brackets H, hinged at $d$, (Fig. 1), and providing the other bracket G, with a slot $f$, through which a clamping screw $g$ passes. Any other convenient means of adjustment may be employed instead; but this is sufficiently easy and simple. When well-dried corn is to be shelled, the breast-beam may be adjusted to an angle much more inclined, than if unseasoned corn is to be shelled, and so the shelling will proceed more rapidly. Thus the machine may be readily adapted to the condition of the corn to be shelled.

This corn-sheller may be worked by hand or horse power. The corn is thrown into the hopper B; and an elastic bar C, is employed to keep the ears close to the shelling cylinder, as described in former Letters Patent granted to me.

What I claim as my invention and desire to secure by Letters Patent, is—

Grooving the shelling cylinder around its periphery, and extending the teeth of the breast beam therein, in combination with the arrangement for adjusting said breast beam to different degrees of inclination, to suit the different conditions of corn to be shelled; substantially in the manner and for the purposes herein set forth.

The above specification of my new and improved corn sheller, signed by me this twenty first day of November, 1855.

JEREMIAH P. SMITH.

Witnesses:
C. A. SNYDER,
W. I. MAGLAUCHLIN.